(12) United States Patent
Wiggins

(10) Patent No.: US 6,643,590 B2
(45) Date of Patent: Nov. 4, 2003

(54) METHOD FOR COMPUTING FINITE-FREQUENCY SEISMIC MIGRATION TRAVELTIMES FROM MONOCHROMATIC WAVEFIELDS

(75) Inventor: James Wendell Wiggins, Stroudsburg, PA (US)

(73) Assignee: WesternGeco, L.L.C., Houston, TX (US)

( * ) Notice: Subject to any disclaimer, the term of this patent is extended or adjusted under 35 U.S.C. 154(b) by 51 days.

(21) Appl. No.: 10/037,554

(22) Filed: Jan. 4, 2002

(65) Prior Publication Data

US 2003/0130796 A1 Jul. 10, 2003

(51) Int. Cl.$^7$ ................................................ G01V 1/28
(52) U.S. Cl. .......................................... 702/16; 702/18
(58) Field of Search ............................ 702/14, 16, 17, 702/18, 2, 6, 10; 67/73

(56) References Cited

U.S. PATENT DOCUMENTS 6,081,482 A * 6/2000 Bevc ........................... 367/73

OTHER PUBLICATIONS

Shunhua Cao et al.; *Finite–difference solution of eikonal equation using an efficient, first–arrival, wavefront tracking scheme*, Apr. 1994, Geophysics, vol. 59, No. 4, pp. 632–643, 9 Figs., 1 Table.

Paul J. Fowler; *Finite–difference solutions of the 3–D eikonal equation in spherical coordinates*, 64th Ann. Internat. Mtg.: Soc. of Expl. Geophysics, pp. 1394–1397.

T. J. Moser; *i Efficient Seismic Ray Tracing Using Graph Theory*, 59th Ann. Internat. Mtg.: Soc. of Expl. Geophysics, pp. 1106–1108, 6 Figs.

J. van et al.; *Upwind finite–difference calculation of traveltimes*, Geophysics, vol. 56, No. 6, Jun. 1991, pp. 812–921, 9 Figs.

Vetle Vinje et al.; *Traveltime and amplitude estimation using wavefront construction*, Geophysics, vol. 58, No. 8 (Aug. 1993); pp. 1157–1166, 16 Figs.

John Vidale; *Finite–Difference calculation of travel times*, Bulletin of the Seismological Society of America, vol. 78, No. 6, Dec. 1988, pp. 2062–2076.

Dave E. Nichols; *Maximum energy traveltimes calcuated in the seismic frequency band*, Geophysics, vol. 61, No. 1 (Jan.–Feb. 1996), pp. 253–263, 9 Figs.

Dave Nichols; *Maximum energy traveltimes calculated in the seismic frequency band*, Stanford Exploration Project, Report 80, May 15, 2001, pp. 1–18.

Dave Nichols; *Modeling adjoint modeling, and migration in V(z) media, using mono–frequency Green's functions*, Standford Exploration Project, Report 79, Nov. 16, 1997, pp. 283–300.

(List continued on next page.)

Primary Examiner—Donald E. McElheny, Jr.
(74) Attorney, Agent, or Firm—David S. Figatner; Madan, Mossman & Sriram

(57) ABSTRACT

A method for determination of seismic wave travel times from a surface location to at least one subsurface computation point (CP) within a plurality of subsurface location points. A velocity model of a region is defined. A complex monochromatic wavefield is computed, using the velocity model, for the at least one CP. An unwrapped phase of the seismic wave is determined at a neighboring computation point (NCP) proximate to at least one subsurface CP. The travel time of the seismic wave to the at least one CP is determined using the unwrapped NCP phase and the computed monochromatic wavefield for the at least one CP. Travel time maps and table may be created from the determined travel time values.

41 Claims, 13 Drawing Sheets

OTHER PUBLICATIONS

B. Biondi et al.; *Solving the Frequency–Dependent Eikonal Equation*, 62nd Ann. Internet. Mtg.: Soc. of Expl. Geophys., Seismic Theory IV: Ray/Spectral Methods, Oct. 28, pp. 1315–1319, 5 Figs.

F. Audebert et al.; *Review of traveltime computation methods*, Stanford Exploration Project, Report 80, May 15, 2001, pp. 1–48.

F. Audebert et al.; *Marmousi traveltime computation and imaging comparisons*, Stanford Exploration Project, Report 80, May 15, 2001, pp. 1–69.

Sebastien Geoltrain et al.; *Can we image complex structures with first–arrival traveltime?*, Geophysics, vol. 58, No. 4, (Apr. 1993), pp. 564–575, 20 Figs.

Dave Hale; *Stable explicit depth extrapolation of seismic wavefields*, Geophysics, vol. 56, No. 11 (Nov. 1991), pp. 1770–1777, 12 Figs.

Dave Hale; *3–D depth migration via McClellan transformations*, Geophysics, vol. 56, No. 11 (Nov. 1991); pp. 1778–1785, 12 Figs.

Wendell Wiggins et al.; *The Relation between the VSP–CDP Transformation and VSP Migration*, 56th Ann. Internat. Mtg.: Soc. of Expl. Geophys., Session S14.2.

* cited by examiner

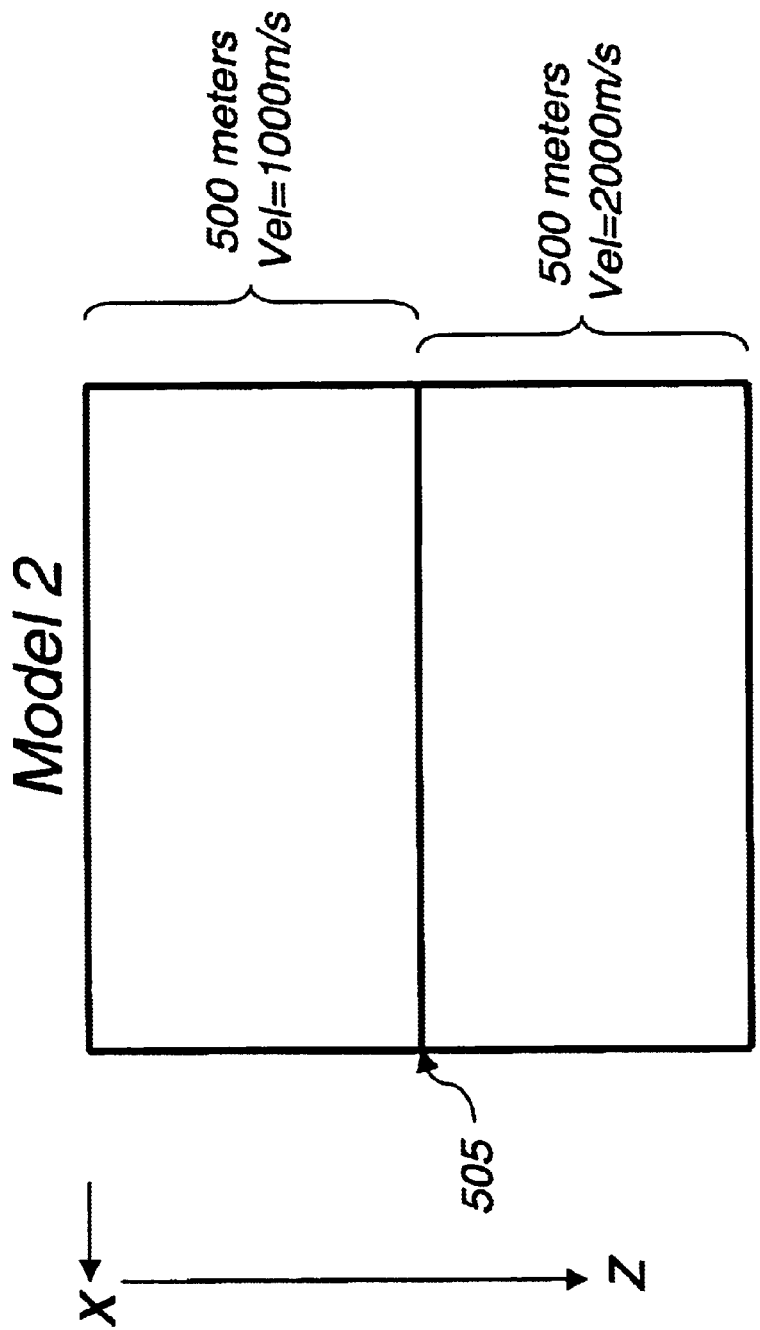

METHOD FOR COMPUTING FINITE-FREQUENCY SEISMIC MIGRATION TRAVELTIMES FROM MONOCHROMATIC WAVEFIELDS

FIELD OF THE INVENTION

This invention relates to the field of geophysical prospecting and, more particularly, to a method for determining travel times and travel time maps for migrating seismic data.

BACKGROUND OF THE INVENTION

In the oil and gas industry, geophysical prospecting techniques are commonly used to aid in the search for and evaluation of subterranean hydrocarbon deposits. Generally, a seismic energy source is used to generate a seismic signal which propagates into the earth and is at least partially reflected by subsurface seismic reflectors (i.e., interfaces between underground formations having different acoustic impedances). The reflections are recorded by seismic detectors located at or near the surface of the earth, in a body of water, or at known depths in boreholes, and the resulting seismic data may be processed to yield information relating to the location of the subsurface reflectors and the physical properties of the subsurface formations.

In one form of geophysical exploration for natural resources, a seismic wavefield is radiated from a source point at or near the surface of the earth. Initially propagating as a spherically expanding wavefront, the radiation insonifies the various earth layers which usually offer an acoustic impedance mismatch at the layer boundaries due to variations in rock density and acoustic velocity. The wavefield is reflected from the respective layer boundaries to return to the surface where the mechanical earth motions due to the reflected wavefield are converted to electrical signals by transducers. The signals which comprise the seismic data, are stored on archival storage media for future processing.

It is the object of seismic studies to produce an image of a volume of subsurface earth formations in a region of geological and/or economic interest. For an isotropic horizontal stratum with constant velocity, the elapsed time between wavefield emission and wavefield reception at a receiver near the source, multiplied by half the average velocity, is the depth of the incident point of the reflected wavefield on the stratum that lies directly beneath the midpoint between the source and receiver.

If a reflector is tilted or the velocity is spatially variable, that simple relationship no longer holds; the incident point is shifted laterally up-dip relative to the source/receiver midpoint. Proper mapping of dipping or tilted reflectors, requires migration of the wavefields originating from those dipping strata.

Complex subsurface conditions preclude simple stacking of seismic records. Complex subsurface conditions scatter seismic waves in many directions. Simple stacking may position subsurface features in the wrong locations. Migration of seismic records can provide more accurate location of subsurface features. Migration involves geometric repositioning of return signals to show an event (layer boundary or other structure) in its proper location. A travel time map is an integral part of prestack migration processing. One well-known migration technique is Kirchhoff depth migration.

For prestack depth imaging, Kirchhoff migration is often chosen for its low computational cost relative to other methods. Kirchhoff migration requires use of wavefront travel time generators of any one of several well-known types that are based on ray tracing. Ray-tracing methods are useful in complex geological structures. Ray-traced travel times permit use of both first-arrival data as well as maximum-energy arrivals, which latter data produce superior imagery. However those methods are very slow and greedy of computer processing time.

The computation of wavefield travel times at selected output points is a key element in successful Kirchhoff depth migration of seismic data. For complex geology, wavefield travel times to the output points are generated by ray tracing from the source. Ray-traced travel-time generation methods produce travel times for all wavefront arrivals at an output point.

One method is taught by U.S. Pat. No. 5,229,938, issued Jul. 20, 1993 to Shein-Shen Wang et al. Here is taught a method for obtaining two-way travel times for source and receiver pairs that includes the steps of determining a set of one way travel times for each source to a plurality of image points and a set of one way travel times for each receiver to a plurality of image points. Ray sets are generated for both sources and receivers. Travel times from a source position.to image points are computed by two-point interpolation using the ray sets. Two-way travel time is computed by summing two sets, one set each for the source and receiver positions. A two-way travel time set is obtained for a particular source and receiver combination for all imaging points.

Eikonal (finite difference) travel time generators are very fast and do not produce shadow zones. Finite difference travel time generators will always pick the first arrival travel times whereas with ray-traced travel-time generators, the desired portion of the wave front must specifically be selected.

A well-known finite-difference travel time generator is disclosed in a paper published in the Bulletin of the Seismological Society of America, v. 78, n. 6, December 1988, pp 2062–2076, by John Vidale. Here the travel times of the first arriving seismic waves through any velocity structure can be rapidly computed on a multi-dimensional grid by finite-difference point-to-point extrapolation. Wavefronts are tracked instead of rays. Refracted waves are properly treated and shadow zones are filled with the appropriate wavefront segments. This scheme is very fast and is useful in tomographic inversion and Kirchhoff migration in geologic section characterized by smooth lateral velocity gradients.

Travel times, from which a travel time map or travel time table may be made, can be directly computed by ray tracing through a specified velocity model. A velocity model may be provided by well-known methods. A velocity model is generally considered to be a representation of the seismic wavefield velocity structure of the earth. The velocity model is a 2D or 3D array describing the distribution of velocities on a grid within the area or volume of interest. The grid may be a Cartesian (x-y-z) grid, although spherical, polyhedral or other grids may also be used. Determining a suitable velocity model for a given seismic data volume or earth structure is well known in the art and will not be discussed here in detail.

A bundle of rays emerging from a source location at the surface (of an earth velocity model) can be propagated down into the earth velocity model and traced through the subsurface while accounting for ray bending caused by changes in velocity gradient and refraction at layer boundaries with velocity contrast. Reflections points along each of the ray-paths are identified as the intersection points of the rays with the layer boundaries. The travel time from the source location at the surface to a reflection point in the subsurface is then calculated by integrating the elements of distance along the raypath divided by the velocity associated with that element. By applying reciprocity, the travel time from a receiver location at the surface to a reflection point in the subsurface can be computed in the same manner. Finally, for a given source-receiver pair at the surface and a reflection point in the subsurface, the total travel time is computed by adding the travel time from the source to the reflection point the travel time from the reflection point to the receiver.

FIG. 1A is an example of a velocity model with one set of 4 raypath segments for a simple 3-layer earth model. Each of the 3 layers, V1, V2 and V3 have velocities such that the velocity of layer V1 is different from V2 and V2 is different from V3. A source location S at the earth surface from which seismic energy as a ray segment (represented by an arrow) propagates through the upper model layer V1. The next ray segment then takes a different path as it traverses the next earth layer V2. The total travel time from the source S to the reflection point M is the sum of the first to ray segments. At the interface of the second layer V2 and third layer V3 the ray reflects at reflection point M back toward the surface with velocity V2 and enters the upper layer V1, traverses this upper layer V1 and then arrives at receiver location R. For this source-receiver configuration, the total source to receiver travel time is computed by adding the ray segment travel times along the 4 individual segment paths.

Computed travel times may be mapped to grids that have a node structure analogous to velocity models. These travel time maps are a 2D or 3D arrays representing the distribution of travel times on a grid within the region of interest. These grids of nodes are analogous also to velocity models in that they may be Cartesian (x-y-z) grids, spherical, polyhedral or other grids.

FIG. 1B is an example of a 2D computation grid that may be used to map travel times from velocity models. All the circles, including S and R, in FIG. 1B represent grid points GP that represent nodes for which a travel time may be evaluated. The grid extends laterally in both directions x as indicated by the arrows, as well as in depth as indicated by the arrow in the z direction.

Travel times may be computed from a finite-difference solution to the eikonal equation or by ray tracing as described previously. However, both methods compute the travel time for an asymptotically high-frequency wave. These high-frequency methods do not map any finite frequencies accurately because the waves will pass through spatially varying velocity regions in frequency-dependent ways.

Kirchhoff migration produces an image by summing recorded reflection seismic data at image pixels, extracting a data sample for the sum at the estimated time required for the wave to travel from source to image point to receiver. Such travel times have been estimated by some solution to the high-frequency eikonal equation for over a decade. The first reported use of an "upwind" finite-difference method to solve the eikonal equation was by Wiggins, et al, 1986. The problems that arise in using high-frequency travel times in Kirchhoff depth migration are well known and much discussed since the early 1990s (Van Trier and Symes, 1991; Vinje, et al, 1993; Geoltrain and Brac, 1993; Audebert, et al, 1994a). Biondi, 1992, tried to improve on the high-frequency methods by performing a frequency-dependent smoothing of the velocity model.

Amplitude preservation during Kirchhoff migration is computationally expensive. For amplitude preservation, it is necessary to weight the migrated traces with suitable migration amplitude factors. Reference may be made to the article by Tygel, published in Geophysics, vol. 59, No. 12 of December 1993, which is a survey of the techniques employed. For example, it may be necessary to calculate a number of weights equal to the number of samples involved in the migration, and this is computationally expensive.

In a 1996 dissertation at Stanford, Dave Nichols computed monochromatic 2D Green's functions and performed 2D migrations in an attempt to avoid limitations of the high-frequency assumption. A Green's function for a given differential equation is the solution to the inhomogeneous equation with a spatial delta function as the source. Nichols computed monochromatic 2D Green's functions using a finite-difference method in polar coordinates. Nichols was looking for a travel time to compute an approximation to the Green's function that was a delta function in time. By treating a monochromatic Green's function as approximately a sine wave, multiple frequencies may be computed and the resulting sine waves superimposed together as a peaked function. The function peak may be chosen as the location of the delta function.

The prior art discloses high-frequency methods and systems that do not accurately compute travel times through earth models with varying velocity structure. The prior art discloses methods and systems to compute migration amplitude factors that are computationally expensive. Accordingly, there is a need for a method and system to compute travel times more efficiently and accurately than prior art methods. There is a need for a system and method to compute migration amplitude factors efficiently to accurately migrate seismic images and represent earth structure.

SUMMARY OF THE INVENTION

A method for determination of seismic wave travel times from a surface location to at least one subsurface computation point (CP) within a plurality of subsurface location points. A velocity model of a region is defined. A monochromatic wavefield is computed, using the velocity model, for the at least one CP. An unwrapped phase of the seismic wave is determined at a neighboring computation point (NCP) proximate to at least one subsurface CP. The travel time of the seismic wave to the at least one CP is determined using the unwrapped NCP phase and the computed monochromatic wavefield for the at least one CP. Travel time maps and table may be created from the determined travel time values.

BRIEF DESCRIPTION OF THE DRAWINGS

The file of this patent contains at least one drawing executed in color: Copies of this patent with color drawing (s) will be provided by the Patent and Trademark Office upon request and payment of the necessary fee. The present invention and its advantages will be better understood by referring to the following detailed description and the attached drawings in which:

FIG. 3B illustrates the velocity model for Model 2.

Figure 1A:
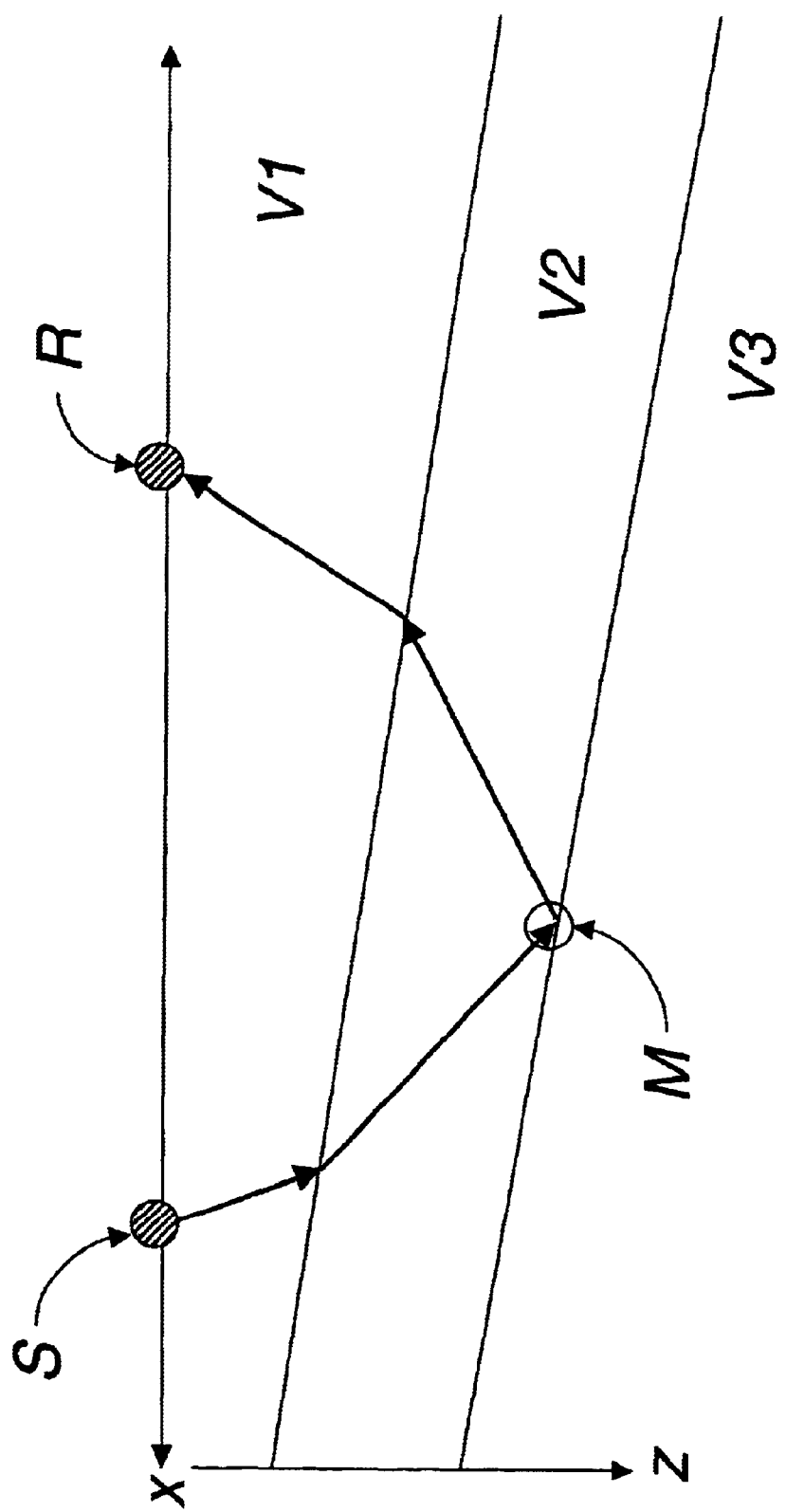
FIG. 1A illustrates an earth velocity model.

While the invention will be described in connection with its preferred embodiments, it will be understood that the invention is not limited thereto. On the contrary, it is intended to cover all alternatives, modifications, and equivalents which may be included within the spirit and scope of the invention, as defined by the appended claims.

DETAILED DESCRIPTION OF THE PREFERRED EMBODIMENTS

The present invention is a method for determining travel times and creating travel time maps and tables for migrating seismic data. The technique of the invention provides for efficient and accurate mapping of travel times, as well as providing for efficient computation of migration amplitude factors. Accordingly, the migration images derived using the travel time mapping of the present invention are more continuous and accurate in position and amplitude. Other advantages of the invention will be readily apparent to persons skilled in the art based on the following detailed description. To the extent that the following detailed description is specific to a particular embodiment or a particular use of the invention, this is intended to be illustrative and is not to be construed as limiting the scope of the invention.

The invention described herein provides an improved method for computing travel times that circumvents the shortcomings of prior art high-frequency methods, such as conventional raytracing. A travel time is computed at a single, finite frequency or a few frequencies that are appropriate for the seismic data. These travel times can give a better seismic image than do the high-frequency methods. Furthermore, the seismic data can be filtered into several frequency ranges, each subrange narrower than the complete data frequency range. Each subrange can be separately migrated with a travel time map or travel time table computed at the center frequency of its subrange to give a continuous quality/cost tradeoff by the choice of number of frequencies. The method of the present invention is more computationally efficient than other methods which may also be improvements on conventional Kirchhoff summation performed with asymptotic high-frequency travel times.

It is an advantage of the present invention that the requirement for a peaked time-domain Green's function is avoided. Travel time is related to the phase of a monochromatic Green's function. A travel time map or table may be derived directly from a single monochromatic Green's function. Travel times are computed from a single frequency or selected frequencies which gives an exact solution (within the accuracy of the method used to compute the Green's function) to the imaging problem for that frequency or selected frequencies. The travel time is approximately correct for neighboring frequencies.

The monochromatic wavefield also gives an amplitude that can be used to compute the migration amplitude factors. The amplitudes computed from raytracing are usually discontinuous and erratically variable. The amplitude obtained at a finite frequency gives smoother migration images and more accurate reflection images.

Figure 2:
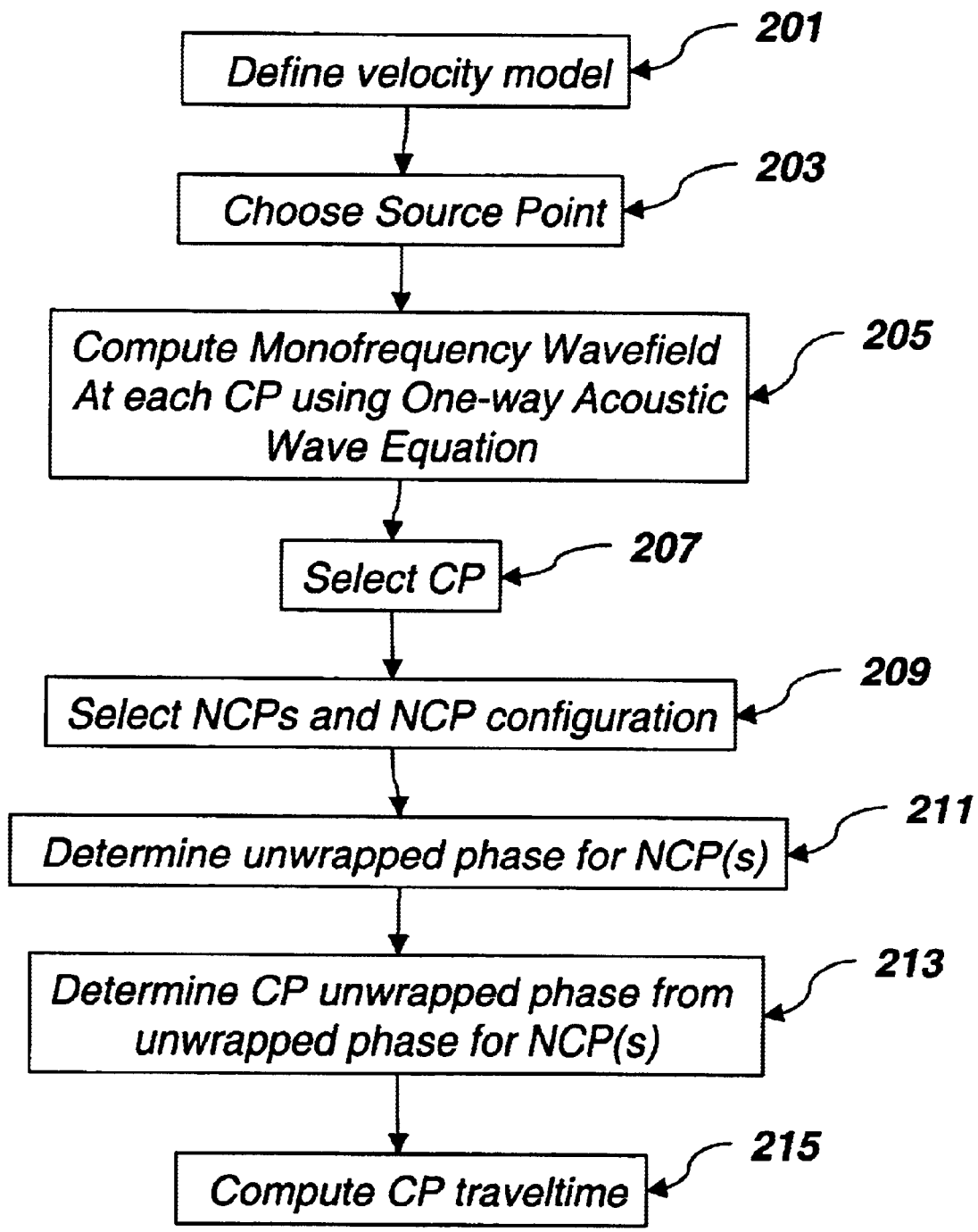
FIG. 2 illustrates a flowchart of a preferred embodiment of the present invention.

FIG. 2 illustrates a flowchart of a preferred embodiment of the present invention. A velocity model in the form of an array describing the distribution of velocities on a grid within the region of interest is defined 201. A source position is chosen 203. The wavefield for this source position is computed 205. In a preferred embodiment, the wavefield is computed using a one-way acoustic wave equation. Alternate embodiments include one and two way solutions to acoustic and elastic wave equations. Each equation can be solved by finite element or finite difference methods, and may be implicit or explicit. The computed wavefield gives an ambiguous, wrapped phase and an amplitude at each computation point. Initial travel times and initial unwrapped phase values may be determined and assigned to any nodes of the array. For example, the unwrapped phase and traveltime at a source position are 0. A Computation Point (CP) adjacent to Neighboring Computation Points (NCP) at which the unwrapped phase has already been computed is chosen 207. Initially, the source point is the only candidate NCP. However, as more unwrapped phases are computed the choice of CP moves outward from the source point and a chosen CP will have several candidate NCPs. The unwrapped phase of a seismic wave arriving at a CP is determined by referring to previously unwrapped phases of proximate Neighboring Computation Points (NCPs). NCPs are selected 209 to provide a reference unwrapped phase used to derive the CP unwrapped phase. In a preferred embodiment, a reference phase is determined from the unwrapped phase at one or more NCPs 211. The reference phase to be used to determine the CP unwrapped phase is derived or chosen by any appropriate method: examples are described below. The reference phase is used to determine the CP unwrapped phase 213. The CP unwrapped phase determined using the NCP reference phase is used for determination of the travel time at the CP 215. In an alternate embodiment of the present invention, travel time maps and travel time tables may be determined using the travel times computed in 215.

An essential step in computing the travel time for the preferred embodiment illustrated in FIG. 2 is to determine an unwrapped phase 211; i.e., to convert the cyclical phase in the range $-\pi$ to $\pi$ into an absolute phase proportional to the travel time.

In the present invention travel times are computed from a single monochromatic Green's function or several selected frequencies as appropriate. A travel time is computed from a single monochromatic Green's function where s(r,t) is a monochromatic point-source excitation for the acoustic wave equation:

$$s(r,t)=\delta(r)e^{i\omega_0 t}, \quad (1)$$

where $r=|\vec{x} - \vec{x}_0|$ is the distance between the source point, $\vec{x}_0$, and an arbitrary subsurface point, $\vec{x}$ in 2 or 3 dimensions. The frequency of excitation is $\omega_0$, time is t and $\delta(\ )$ is the Dirac Delta function.

Now, $U(\vec{x}, \vec{x}_0, \omega)$ is a solution to the acoustic wave for the excitation $s(r,\omega)=FT(s(r,t))$:

$$\nabla^2 U + \frac{\omega^2}{v^2} U = s(r, \omega) = \delta(r)\delta(\omega - \omega_0). \quad (2)$$

U can be computed for a given velocity, $v(\vec{x})$, by any of the well-known methods for computing solutions to the acoustic wave equation. This solution is divided into amplitude and phase:

$$U = A(\vec{x}, \vec{x}_0, \omega) e^{i\Phi(\vec{x}, \vec{x}_0, \omega)}, \quad (3)$$

where $A(\vec{x}, \vec{x}_0, \omega) = |U|$ is the amplitude and $\Phi(\vec{x}, \vec{x}_0, \omega) = \arctan(\mathrm{Im}(U)/\mathrm{Re}(U))$ is the phase.

There are no approximations involved in this division of U: it is simply an alternate method for representing a complex function. The time-domain solution is obtained by inverse Fourier transforming $U(r,\omega)$. Since U has only a single frequency, its inverse Fourier transform is simply $$U(\vec{x}, \vec{x}_0, t) = A e^{i(\Phi - \omega_0 t)}. \quad (4)$$

A crest of the wavefield in (4) occurs when the exponent is zero:

$$\Phi - \omega_0 t = 0 \quad (5)$$

which implies $$t = \frac{\Phi}{\omega_0} \quad (6)$$

$\Phi$ is, however, ambiguous to the extent that any multiple of $2\pi$ added to it will give the same wavefield. This ambiguity has to be removed before $t = \Phi/\omega_0$ becomes a useful formula for computing traveltime. If the wavefield is computed on a grid spacing of a half-wavelength or less, then the limited change in phase from one computation point to a neighboring point can be used to remove the ambiguity.

The phase of the wavefield and the traveltime is known at the source point from the definition of the computation:

$$\Phi_{source} = t_{source} = 0$$

Then since we know that the wavefield at computation points adjacent to the source requires a positive traveltime and is less than a wavelength from the source, we may choose their absolute or unwrapped phase to include the multiple of $2\pi$ that places the difference $\Phi - \Phi_{source}$ in the range $[0, 2\pi]$.

Once the points adjacent to the source have been assigned an unwrapped phase, the points next adjacent to them can receive an unwrapped assignment. This assignment proceeds iteratively outward from the source point until all computation points have been assigned an unwrapped phase. At each iteration, a reference phase, $\Phi_{ref}$, is computed from the previously unwrapped phases of the points neighboring the point in question. The multiple of $2\pi$ is chosen for the phase, $\Phi$, of the point in question to make $\Phi - \Phi_{ref}$ lie in the range $[0, 2\pi]$. Alternately a prediction of the unwrapped phase at a point can be made as $\Phi_{prediction} = \Phi_{ref} + d\Phi$ where $d\Phi$ is computed as the local wave propagation time from the reference point to the prediction point. Then the multiple of $2\pi$ can be chosen to place the difference, $\Phi - \Phi_{prediction}$, in the range $[-\pi, \pi]$.

The amplitude $A(\vec{x}, \vec{x}_0, \omega)$ is used to provide the amplitude factors required in Kirchhoff migration. A simple example of computing the travel time from a monochromatic solution is provided by the constant-velocity case. The solution is obtained analytically as $$U = \frac{A_0}{r} e^{i\left(\frac{\omega}{v} r - \omega t\right)}. \quad (7)$$

The travel time is simply $$t = \frac{\Phi}{\omega} = \frac{\frac{\omega}{v} r}{w} = \frac{r}{v}. \quad (8)$$

This time, t, is the straight-line travel time.

Resolving phase ambiguity by phase unwrapping (211 in FIG. 2) is accomplished through analysis of adjacent computation points in a travel time map by applying the iterative method described above for assigning an unwrapped phase to each computation point. The computation of the monochromatic wavefield yields a complex wave function at each Computation Point (CP) in a travel time map. Any of the grid points GP represented in FIG. 1B may be a CP.

The computation may be accomplished using the real and imaginary parts of the complex function. The phase, $\Phi$, of the wave function, U, is given by $$\Phi = \arctan\left(\frac{\mathrm{Im}(U)}{\mathrm{Re}(U)}\right). \quad (9)$$

This phase is ambiguous to the extent that any addition of a multiple of $2\pi$ leaves the wave function unchanged. Therefore, to use the phase as the basis of a travel time computation using equation 6, this ambiguity must be resolved.

The resolution of this ambiguity requires additional information beyond the complex values at the CP. That additional information comes from NCPs, the spatial evolution of the wavefield, and auxiliary choices for defining the travel time.

Figure 1B:
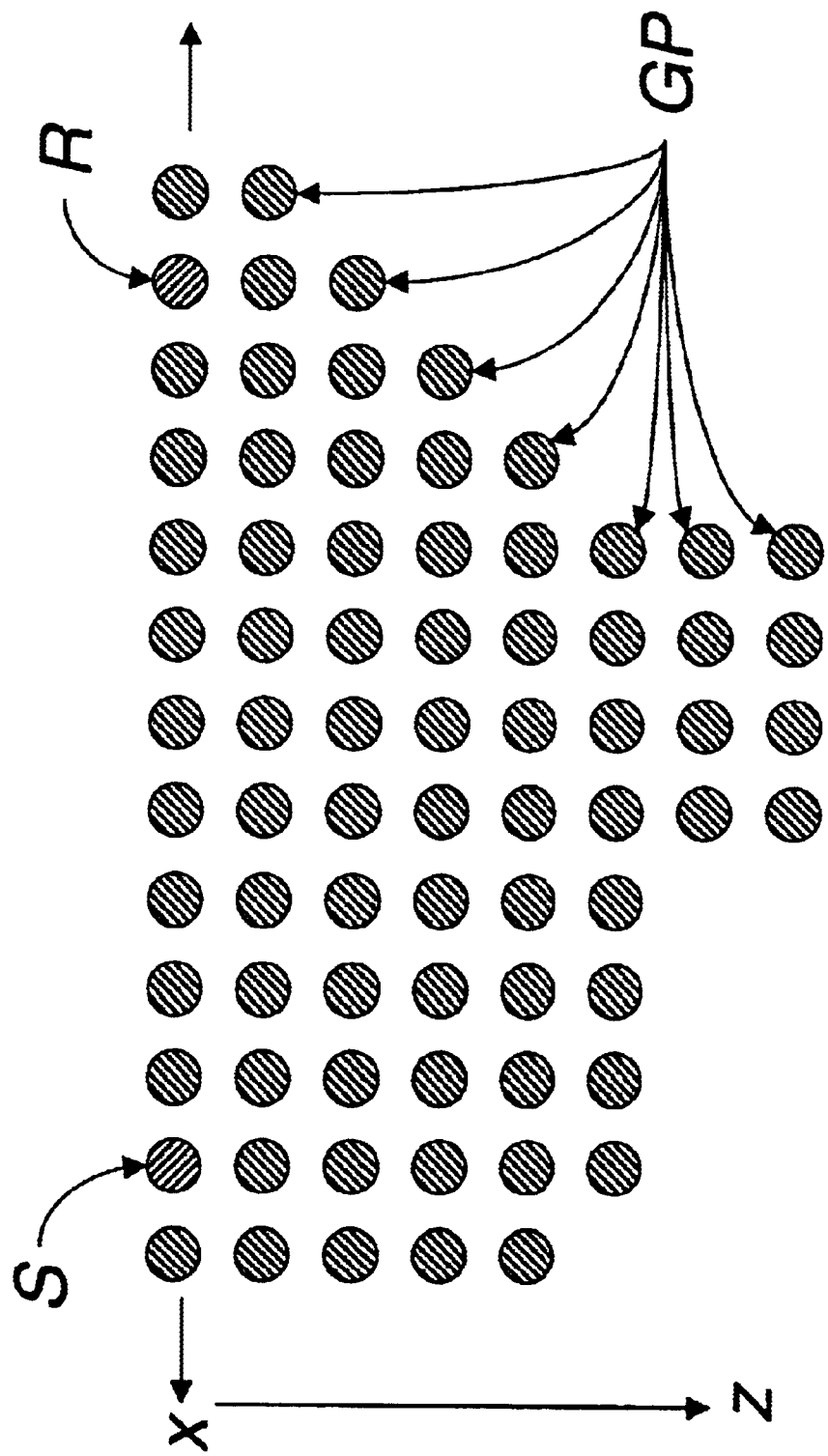
FIG. 1B illustrates an example of a computation grid that may be used to map travel times derived from velocity models.
Figure 1C:
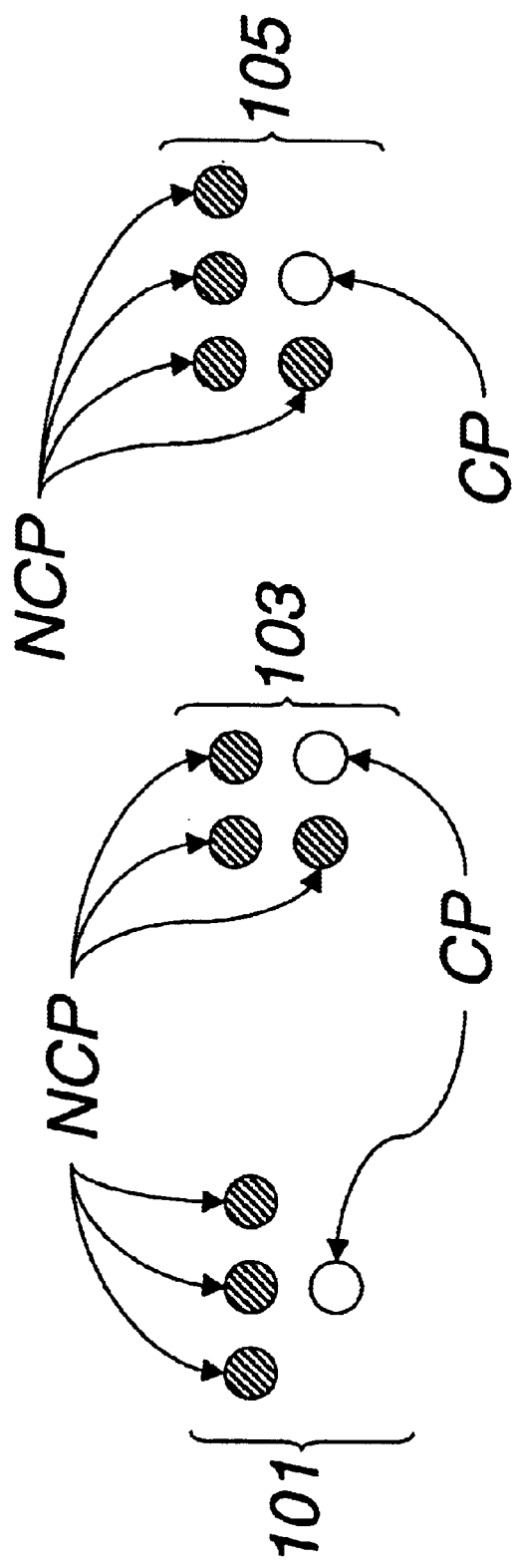
FIG. 1C illustrates selected configurations of neighboring computation points relative to grid computation points of FIG. 1B.
Figure 1C:
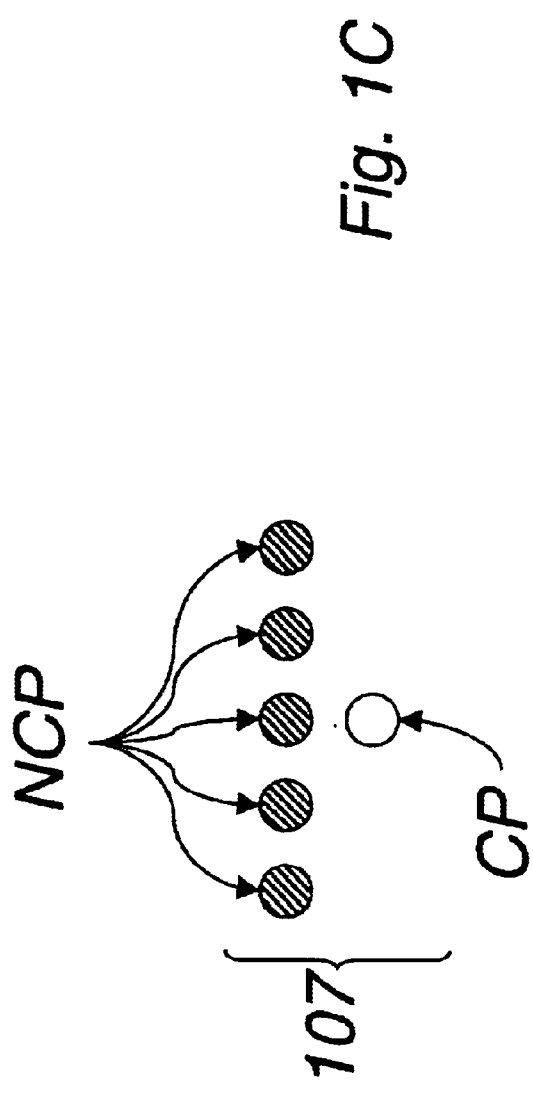

Examples of groups of NCPs for selection in 209 of FIG. 2 are chosen from the following non-exhaustive examples of configurations relative to a CP in FIG. 1C. The NCPs in configuration 101 are above the CP of 101 in depth. The computation grid nodes shown are examples of a "vertical configuration" in displays 101 and 107. The "corner configurations," 103 and 105, are reversed left/right as needed to place the side NCP (the NCP adjacent in depth to the CP) nearest the source point. When a corner point configuration is used, a vertical configuration is used to compute the first CP on a new depth row of CPs. Other configurations will be apparent to those versed in the art. These configurations are straightforward to extrapolate from 2D to 3D.

In discrete numerical computations, the wavefield is computed at CPs close enough to determine the absolute relative phase change from one CP to its neighbors. In finite-difference computations, the CPs must be spaced less than one-half wavelength apart, thus limiting the phase difference to less than $\pi$. In some Fourier methods, the CPs may be more than a half-wavelength apart, but the computation method assumes a known functional dependence of the phase between those CPs. Therefore, given the unwrapped phase at a set of NCPs, the phase of the wave at the CP can be determined by requiring it to be within a phase difference of ±π from a phase, $\Phi_{CP}$, predicted from the NCPs.

A second ambiguity arises when the unwrapped phase (211 in FIG. 2) predicted from one NCP differs from the unwrapped phase predicted from another NCP. This ambiguity can be resolved by a choice among the possibilities. The unwrapped phase can be predicted from the strongest-amplitude NCP among a selected configuration, or from a predictor derived from amplitude-weighted NCPs. Alternatively preference can be given to NCPs most nearly along the line from source point to CP. These methods may be used, for example, in an explicit finite-difference downward-continuation wave propagator. Resolving the NCP ambiguity is discussed in the following examples in conjunction with determining the phase of the CP.

Figure 1D:
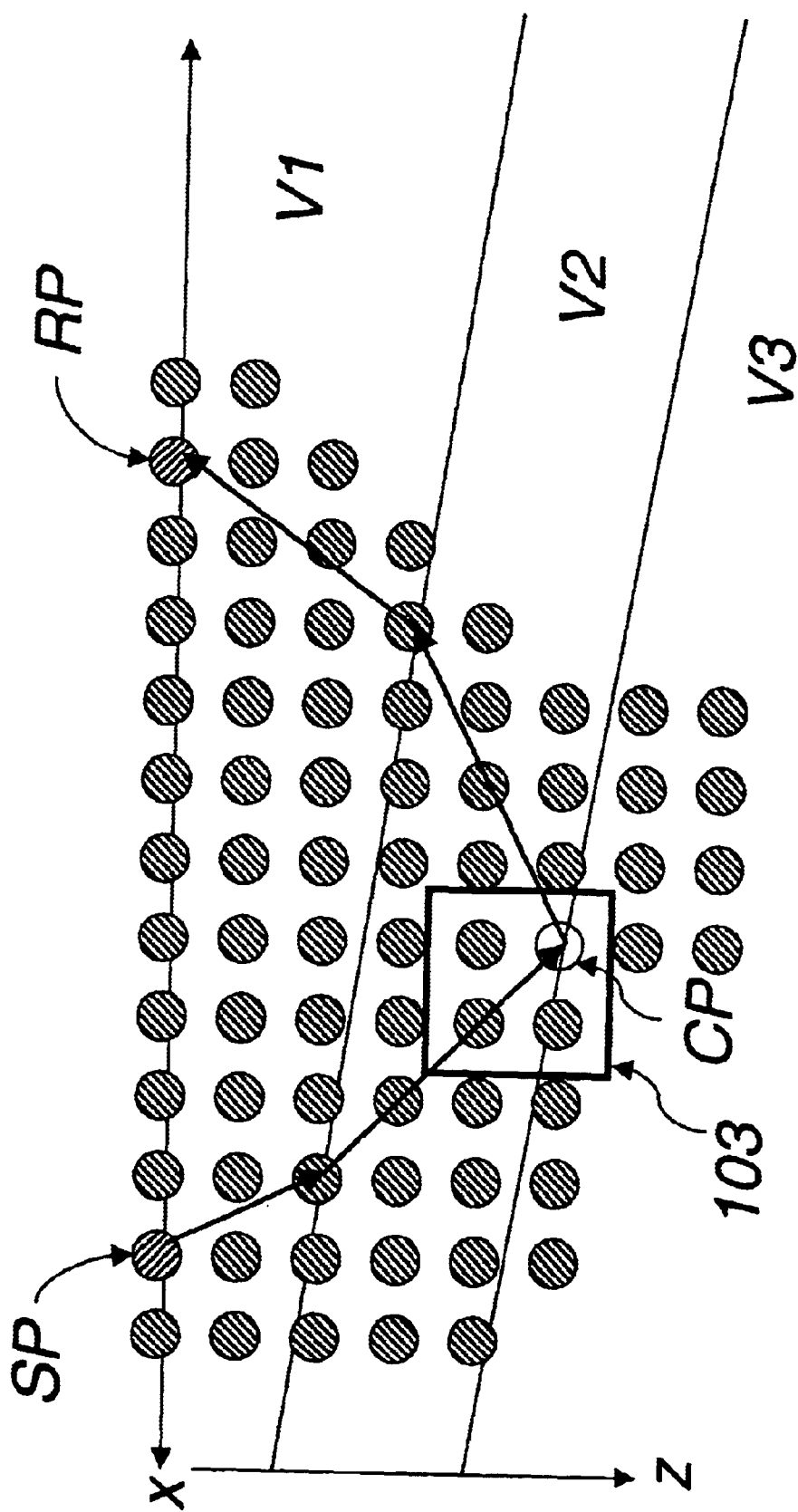
FIG. 1D illustrates a schematic example of how the travel time map computation grid of FIG. 1B relates to the simple velocity model of FIG. 1A in conjunction with the phase unwrapping for a computation point of the present invention.

FIG. 1D shows a schematic example of how the travel time map computation grid of FIG. 1B relates to the simple velocity model of FIG. 1A in conjunction with the phase unwrapping for a CP of the present invention. A ray propagates from source position SP through the layer with velocity V1 and enter the layer with velocity V2 where it arrives at Computation Point CP. The CP shown in FIG. 1D is coincidentally in this example also a reflection point, but any grid point may be a CP. Outline box 103 encloses a selected corner configuration of a CP with 3 NCPs.

FIG. 1C shows several NCP configurations 101, 103, 105 and 107. These configurations are useful in a rectangular-grid, downward-continuation computation of the wavefield. If phase unwrapping is sequential in horizontal rows of increasing depth and sequential computation toward both sides from the source position within a row, then the NCP configurations shown in FIG. 1C always have unwrapped phases available at all the NCPs used for a given CP.

A maximum amplitude predictor may be used to resolve CP phase ambiguity in 213 for FIG. 2 using a chosen set of NCPs, for example configuration 103 from FIG. 1D. The predicted phase at the CP is $$\Phi_{CP} = \Phi_{MAX} + \frac{\omega \cdot dr}{v}, \quad (10)$$

where $\Phi_{MAX}$ is the reference phase, the previously unwrapped phase at the NCP with the greatest amplitude, and dr is the distance separating the CP and the NCP with the greatest amplitude. The phase at the CP is the wrapped phase given by Equation 9 with a multiple of 2π it added to place it in the range $\Phi_{CP}$±π.

Figure 1E:
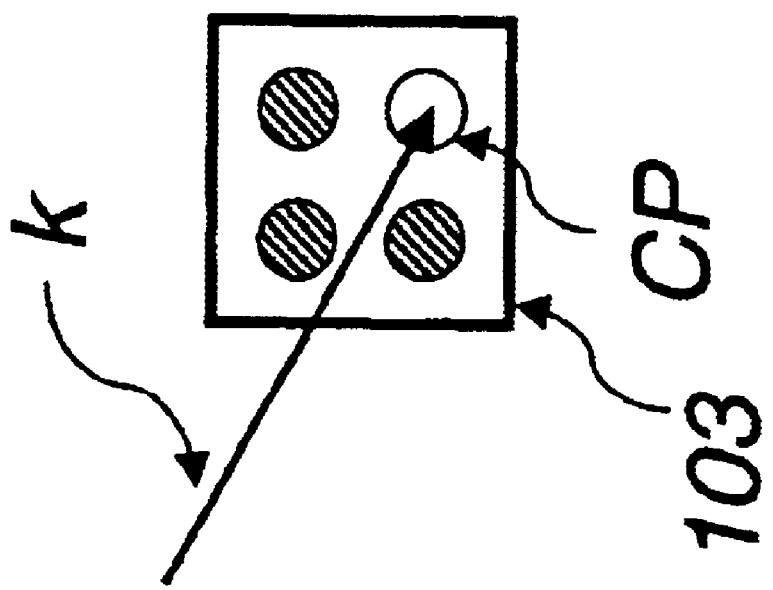
FIG. 1E illustrates an example configuration of the unwrapping process.

As an example of a configuration in the NCP unwrapping process for 211 in FIG. 2, the local direction of the wavefield is characterized by the wavenumber vector k in FIG. 1E where k is the wavenumber characterizing a local estimate of the wave direction. In a maximum amplitude prediction method to determine the phase, $\Phi_{CP}$, at the node CP, the one of the three NCP nodes with the largest amplitude of configuration 103 would be used as the reference phase, $\Phi_{MAX}$, and the predicted phase 213 for the preferred embodiment as illustrated in FIG. 2 is $$\Phi_{CP} = \Phi_{MAX} + k \cdot \vec{dx}, \quad (11)$$

where k is estimated from the NCPs and $\vec{dx}$ is the vector from the reference point to the CP. An alternative plane wave method would be to choose the maximum amplitude of the two left NCP nodes which k passes between in the FIG. 1E configuration 103, instead of all three NCPs. This is an example of preference given to NCPs most nearly along the line from source point to CP. While these are 2D examples, it is straightforward to extend these cases to 3D.

An amplitude-weighted least-squares plane-wave predictor can be chosen to resolve phase ambiguities. Examples include a set of NCPs such as the vertical configuration 107 of the five NCPs most directly above the CP in FIG. 1C, or as the corner configuration 105 of the three NCPs most directly above the CP plus the NCP at the side of the CP that is closest to the source point. These NCP phases and amplitudes can be used in a weighted linear least-squares solution in the 2D case for the parameters $\Phi_0$, the reference phase as from 211 FIG. 2, $k_x$, the lateral dimension, and $k_z$, the depth dimension. The predicted phase is given by $$\Phi_{CP} = \Phi_0 + k_x \cdot dx + k_z \cdot dz. \quad (12)$$

This may be extended to 3D as $\Phi_{CP} = \Phi_0 + k_r \cdot dr$, where r is extended to any chosen coordinate system.

Similarly, a simple plane-wave predictor for resolving phase ambiguity may be used by choosing a configuration from FIG. 1C. For example, the configuration 103 of the NCP set composed of the NCP directly above the CP, the NCP at the side of the CP closest to the source point SP, and the NCP completing the rectangle defined by the CP and the first two NCPs (e.g., 103 in FIG. 1C and FIG. 1D and FIG. 1E). The phase of these three NCPs uniquely defines a plane wave predictor as in equation 12.

A Huygen's wavelet predictor may be employed by choosing any set of NCPs. Construct $$\Phi_{CP} = \sum_{NCPs} \left( \Phi_{NCP} + \frac{\omega \cdot dr}{v} \right). \quad (13)$$

The wavelet sum may also be weighted, e.g., by amplitude:

$$\Phi_{CP} = \sum_{NCPs} A_{NCP} \left( \Phi_{NCP} + \frac{\omega \cdot dr}{v} \right). \quad (14)$$

As these examples show there are many options for constructing predictors.

A downward-continuation wave-extrapolation method may be used for the travel time computation. First, compute the wavefield, U, for a single frequency. Then, at each depth step, compute the local phase from Equation 9 as $\Phi = \tan^{-1}(\text{Im}(U)/\text{Re}(U))$.

Compute the angle using, for example, the C-language atan2( ) function which returns a value in the range -π to π. If the value is negative, 2π may be added to give a range of 0 to 2π for the local phase. The returned value may be compared to the already determined phase at the grid cell most nearly in the direction of the source location at the previous depth step. A multiple of 2π may be added to the local phase to give a global phase that is 0 to 2π greater than the global phase at the compared location. In addition to this very simple phase predictor, a variety of predictors give identical or similar travel time results in velocity models.

The examples discussed here for FIGS. 3A, 3B, 4 and 5 use the following parameters:
   Computational grid dimensions: nx=nz=100.
   Computational grid spacing: dx=dz=10 m.
   Frequency: 10 Hz.
   Velocity:
      Model 1 in FIG. 3A: 1000 m total in x and z. Velocity is constant throughout model, 1000 m/s.

Model 2 in FIG. 3B: Two 500 m thick layers, upper layer is 1000 m/s and lower layer is 2000 m/s.

Figure 3A:
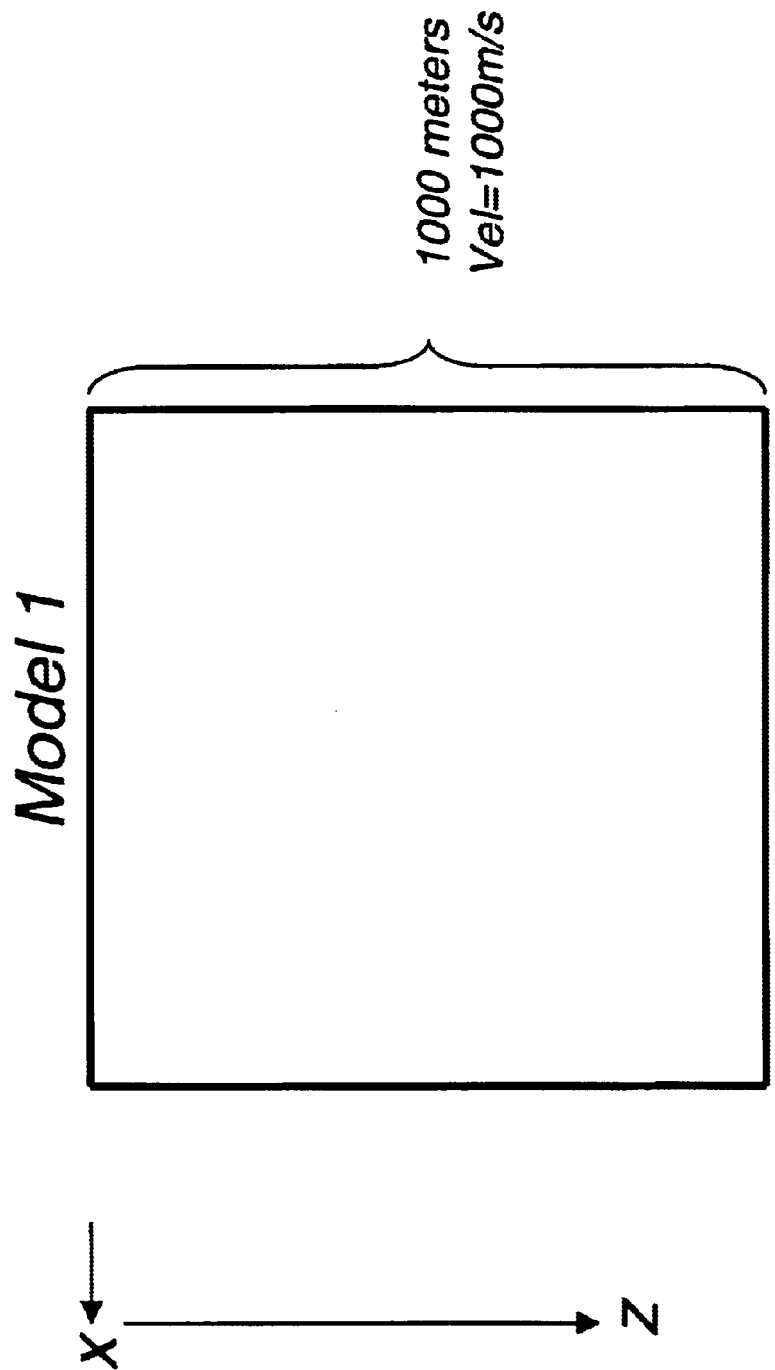
FIG. 3A illustrates the velocity model for Model 1.
Figure 4:
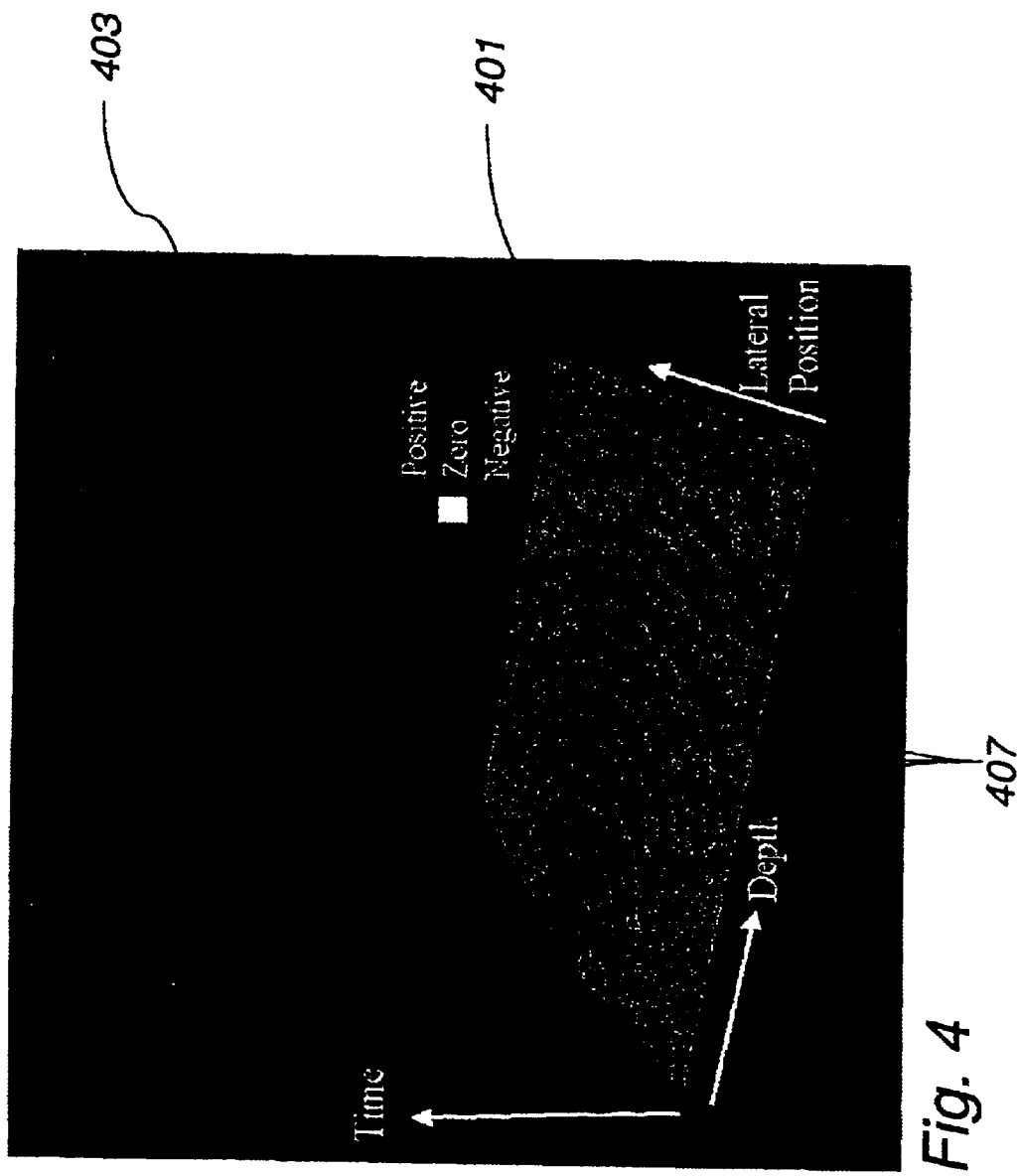
FIG. 4 illustrates the wavefield and derived travel time for Model 1.

FIG. 4 shows the real part of U 401 and the unwrapped phase for a constant velocity model, Model 1 from FIG. 3A. The unwrapped phase increases with an approximately constant slope as expected from Equation 8. The travel time derived from the wavefield phase for the constant velocity model is shown as the conical surface 403. Time is plotted upward from the horizontal plane 401. The isophase contours 407 in the color map 401 show the waves propagate steadily in depth in the absence of any velocity discontinuity.

Figure 5:
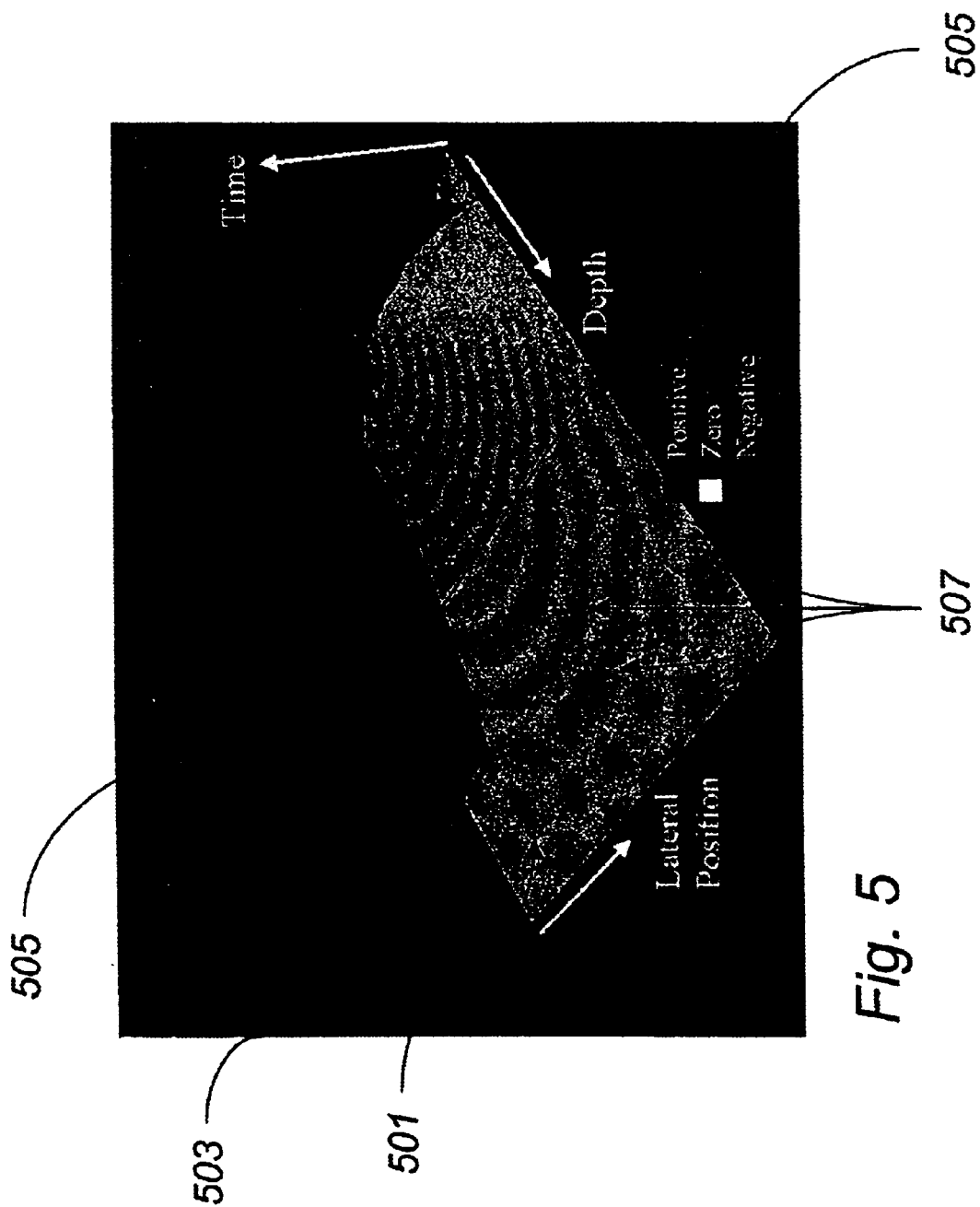
FIG. 5 illustrates the wavefield and travel time for Model 2.

FIG. 5 shows the wavefield 501 and derived travel time 503 for a velocity model, Model 2 from FIG. 3B, in which the velocity doubles at half the maximum depth, the velocity discontinuity shown at 505. The real part of the computed wavefield is shown as a color map on the horizontal plane 501. The travel time derived from the wavefield phase is shown as a surface 503 with time being represented by elevation above the horizontal plane.

FIG. 5 shows the results from Model 2 with a horizontal velocity discontinuity 505. The velocity below the discontinuity 505 is double its value above the discontinuity. The slope of the travel time surface 503 is halved below the discontinuity as expected. The isophase contours 507 in the color map 501 show the wave bulging out as it encounters the velocity discontinuity 505.

Figure 6:
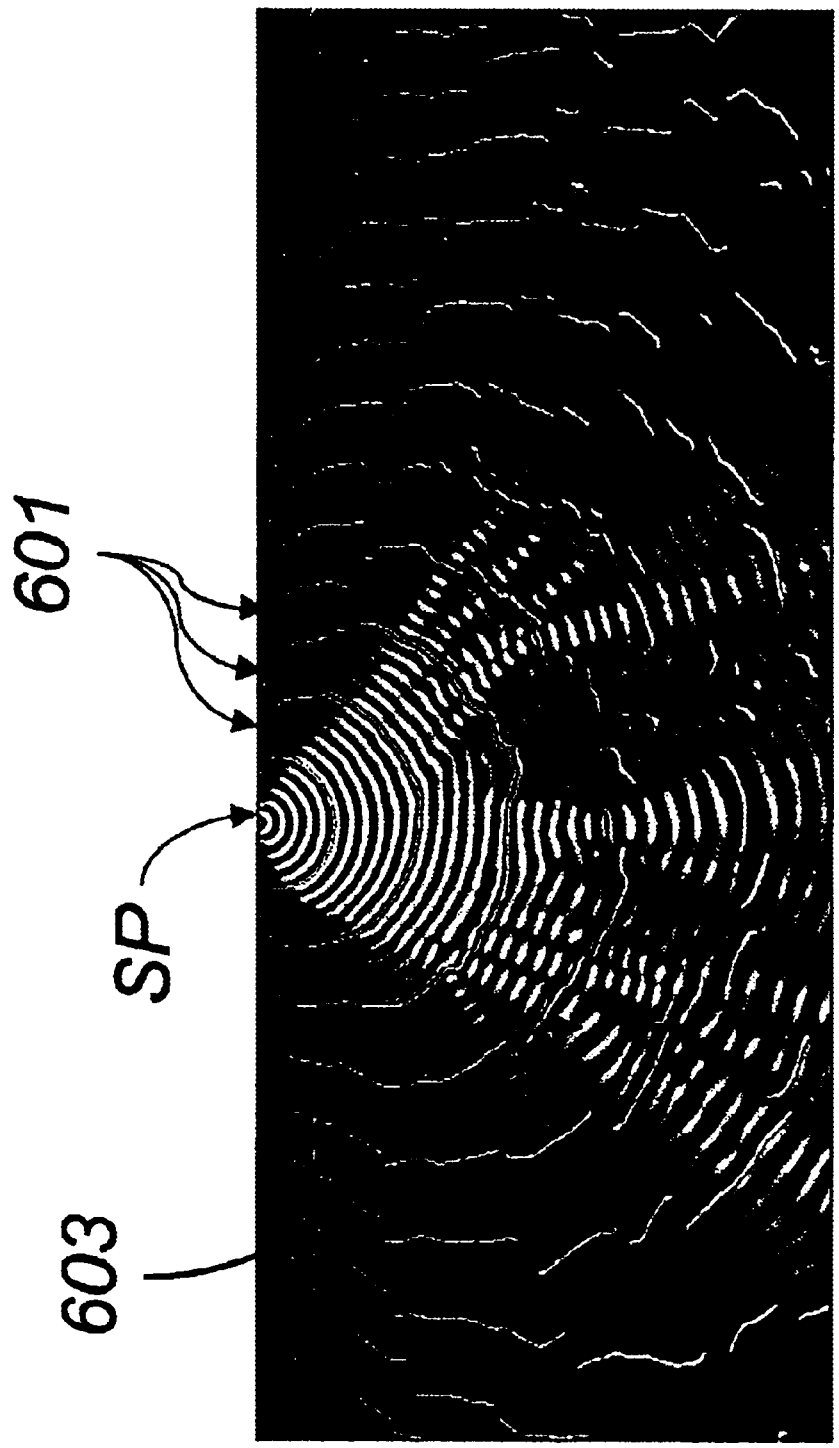
FIG. 6 illustrates the real part of a 30 Hz wavefield in the Marmousi model with constant time contours overlaid.
Figure 7:
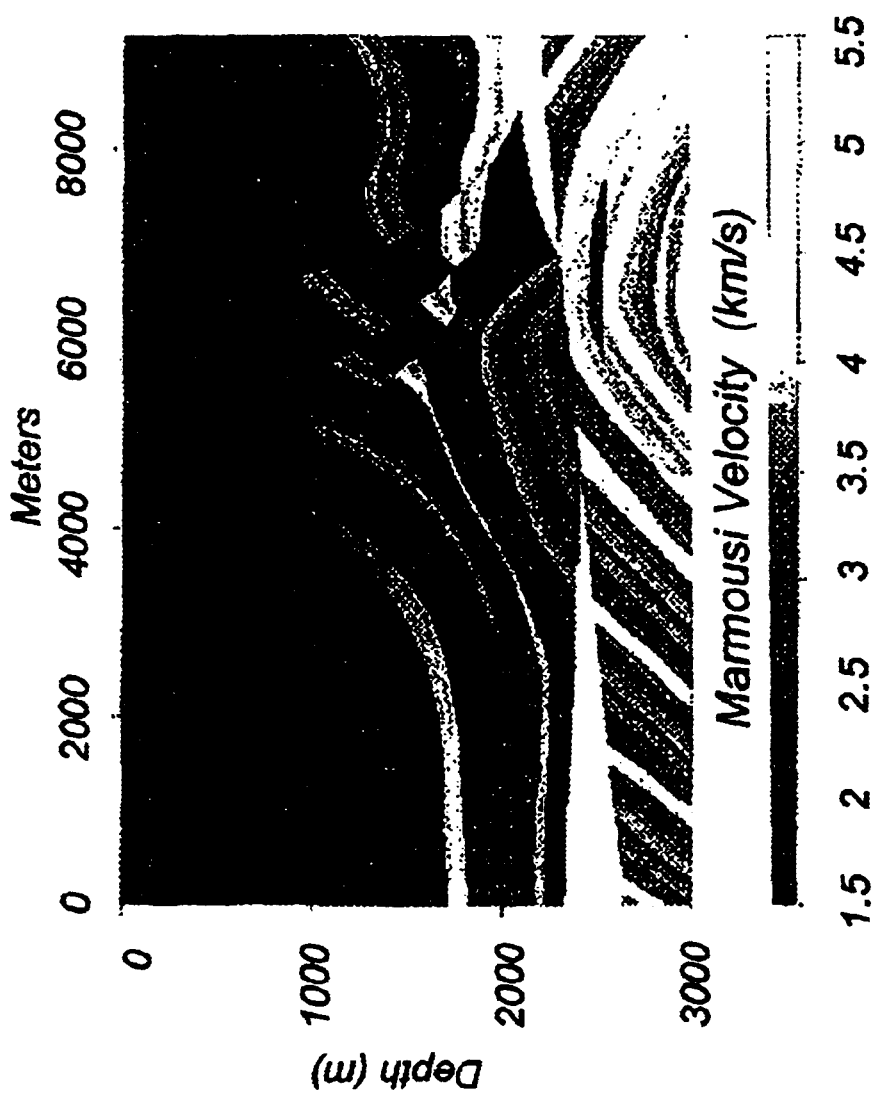
FIG. 7 illustrates velocity model for the Marmousi model.

FIG. 6 illustrates the real part of a 30 Hz wavefield in the Marmousi model with isochrons 601 of the maximum-amplitude travel time overlaid. The Marmousi synthetic data set (Bourgeois et. al., Proceedings of the 1990 EAEG Workshop on Practical Aspects of Data Inversion: Eur. Assoc. Expl. Geophys., 5–16, 1991) was released as a test for velocity estimation. The data set is often used for testing migration and velocity seismic data processing algorithms. It is a complicated acoustic 2-D data set based on the geology of the Cuanza basin in Angola. The velocity model is shown in FIG. 7. The structural style is dominated by growth faults which arise from salt creep and cause the complicated velocity structure in the upper part of the model. The main imaging objective is the reservoir in the anticlinal structure below the salt.

Figure 8:
FIG. 8 illustrates the Marmousi data migrated prestack using travel times derived from 30 Hz point-source wavefields.

FIG. 8 illustrates the method of the present invention used with the Marmousi data. The Marmousi data have been migrated prestack using travel times derived from 30 Hz point-source wavefields. The clarity and quality of the reflections at the bottom of the reflections at the main imaging objective of the model illustrate the fidelity of the migration.

A monochromatic wavefield can be characterized as having relatively high-amplitude streams, for example 603 is high amplitude stream in FIG. 6, in which the phase has a smooth monotonic increase. There may be apparent gaps between the streams representing data areas that have relatively low amplitude. These gaps are where multiple arrivals overlap creating destructive interference and thus will produce only weak reflections. A phase unwrapping that finds the proper unwrapped phase in the high amplitude areas and uses these as references in the low amplitude apparent gaps can be used to improve the stability of the unwrapping process.

An alternate method for computing a wide-aperture wavefield is to compute the wavefield on an expanding polyhedral shell. For example, a grid defined on an icosahedron is useful since the normal to each face of the icosahedron is approximately radial. Wavefields may be computed on approximately spherical polyhedral shells using finite-difference methods or other numerical methods.

Computation of a wave travel time from a monochromatic solution of a wave equation may take several different forms. Solutions of the acoustic wave equation may include one-way solutions of the acoustic wave equation and two-way solutions of the acoustic wave equation. Solutions of the elastic wave equation may be used with this invention. Elastic wave equation solutions also include one-way solutions and two-way solutions. Numerical method solutions include finite difference methods, finite element methods and Fourier transform methods, as well as other transforms. Methods for unwrapping the phase of the wave at a given computation point (CP) by analyzing the previously unwrapped phases and wrapped phases of a set of neighboring computation points (NCPs), include: choosing the NCPs from the relative position of source point and CP, choosing the NCPs by analyzing the local gradient of the travel time or wrapped phase, finding the highest amplitude NCP, finding the smallest unwrapped phase of a NCP, fitting a plane-wave to the NCPs, fitting an amplitude weighted or an otherwise weighted plane wave to the NCPs, and performing an amplitude or otherwise weighted Huygens wavelet computation derived from the NCPs.

Migration amplitudes or amplitude weighting parameters for Kirchhoff migrations may be derived from the amplitudes computed for the monochromatic wavefield solutions. Kirchhoff migration may be performed using travel times computed as disclosed here. Kirchhoff migration may be performed in multiple frequency bands using travel times for each band computed at a selected frequency or frequencies in that band.

The travel time maps or tables for depth migration may be computed from monochromatic point-source wavefields or Green's functions. These travel time maps are exact solutions to the wave equation at the computed frequency and are better approximations for a neighboring frequency band than travel times computed with high-frequency asymptotic methods.

Travel times can be computed at a few frequencies in the seismic band. The seismic data can be decomposed into bands around these frequencies and each band can be migrated with its associated travel time. The full seismic image can be recovered by summing these bandlimited images since the imaging process is linear. By choosing the number of bands to use, we can expect an incremental improvement in the image quality with an incremental increase in computational cost.

As a final summary of the invention, a velocity model is defined and a source location is chosen. The complex wavefield is computed for each CP. The wrapped phase is computed at each CP, for example using the arctan function. An iterative loop begins at the source point. Initially the unwrapped phase is known only at the source point since it is zero. The iterations are specialized for the CPs adjacent to the source point since it is the only NCP that has an unwrapped phase at that iteration. The iterations are specialized for the top row of the array of CPs because there is no row above them. The iterations may be specialized at the edges of the model if some of the general-case NCPs are missing.

The general case is used after special cases have been handled. Choose a CP with NCPs that already have unwrapped phases. The order of choosing CPs is governed by the necessity of having unwrapped NCPs in the proper disposition. The order proceeds more or less radially from the source point. Compute a reference phase from the unwrapped phases of the NCPs. Compute a predicted unwrapped phase at the CP from the reference phase and a propagation delay. Select the multiple of $2\pi$ to add to the wrapped phase of the CP so that the resulting unwrapped phase is as close as possible to the predicted unwrapped phase or alternately, is as close as possible but the difference is >0.

Persons skilled in the art will understand that the method described herein may be practiced as disclosed, including but not limited to the embodiments described. Further, it should be understood that the invention is not to be unduly limited to the foregoing which has been set forth for illustrative purposes. Various modifications and alternatives will be apparent to those skilled in the art without departing from the true scope of the invention, as defined in the following claims.

What is claimed is:

1. A method for determination of a travel time of a seismic wave from a surface location to at least one computation point (CP) within a plurality of subsurface location points comprising:
    (a) defining a velocity model of a region including said plurality of subsurface location points;
    (b) computing a monochromatic wavefield, using the velocity model, for the at least one CP;
    (c) determining an unwrapped phase of the seismic wave at at least one neighboring computation point (NCP) proximate to the at least one CP in said plurality of location points; and
    (d) determining the travel time of the seismic wave to the at least one CP from said determined unwrapped phase and said computed monochromatic wavefield for the at least one CP.

2. The method of claim 1 wherein said surface location is at least one of: i) a source location, and ii) a receiver location.

3. The method of claim 1 wherein computing the monochromatic wavefield for the at least one CP further comprises determining a monochromatic solution to at least one of: i) a one way elastic wave equation, ii) a two way elastic wave equation, iii) a one way acoustic equation, and iv) a two way acoustic wave equation.

4. The method of claim 3 wherein computing the monochromatic wavefield further comprises solving for wave equation solutions with at least one of: i) a finite element method, ii) a finite difference method, iii) an explicit method, and iv) an implicit method.

5. The method of claim 3 wherein computing the monochromatic wavefield further comprises using at least one Green's function.

6. The method of claim 3 further comprising deriving Kirchhoff migration amplitude factors from the computed monochromatic wavefield.

7. The method of claim 1 wherein the at least one CP comprises a plurality of CPs.

8. The method of claim 1 wherein the at least one NCP comprises a plurality of NCPs.

9. The method of claim 1 further comprising determining, from the at least one computed travel time, at least one of: i) a travel time map, and ii) a travel time table.

10. The method of claim 1 wherein the at least one NCP comprises a plurality of NCPs, the method further comprising determining the phase of the plurality of NCPs by forming a weighted sum of the phases of the plurality of NCPs.

11. The method of claim 1 wherein determining an unwrapped phase of the at least one CP comprises limiting the unwrapped phase of the at least one CP to be within $\pm\pi$ of the determined phase for the at least one NCP.

12. The method of claim 1 wherein determnining the travel time further comprises computing the monochromatic wavefield on a polyhedral surface.

13. The method of claim 1 wherein determining the travel time further comprises computing the monochromatic wavefield on a polyhedral surface that is a icosahedron.

14. The method of claim 1 wherein determining the travel time of the seismic wave to the at least one CP further comprises at least one of: i) analyzing the local gradient of a travel time, ii) analyzing the local gradient of a wrapped phase, iii) determining a highest amplitude the at least one NCP, iv) determining the smallest unwrapped phase of the at least one NCP, v) fitting a plane wave to the at least one NCP, vi) fitting a weighted plane wave to the at least one NCP, and vii) computing a weighted Huygen's wavelet from the at least one NCP.

15. A method for determination of a travel time map for a seismic wave from a surface location to at least one computation point (CP) within a plurality of subsurface location points comprising:
    (a) defining a velocity model of a region including said plurality of subsurface location points;
    (b) computing a monochromatic wavefield, using the velocity model, for the at least one CP;
    (c) determining an unwrapped phase of the seismic wave at at least one neighboring computation point (NCP) proximate to the at least one CP in said plurality of location points;
    (d) determining the travel time of the seismic wave to the at least one CP from said determined unwrapped phase and said computed monochromatic wavefield for the at least one CP; and
    (e) storing the travel time values in the form of a map.

16. The method of claim 15 wherein said surface location is at least one of: i) a source location, and ii) a receiver location.

17. The method of claim 15 wherein the at least one CP comprises a plurality of CPs.

18. The method of claim 15 wherein the at least one NCP comprises a plurality of NCPs.

19. The method of claim 15 wherein the at least one NCP comprises a plurality of NCPs, the method further comprising determining the phase of the plurality of NCPs by forming a weighted sum of the phases of the plurality of NCPs.

20. The method of claim 15 wherein determining an unwrapped phase of the at least one CP comprises limiting the unwrapped phase of the at least one CP to be within $\pm\pi$ of the determined phase for the at least one NCP.

21. The method of claim 15 wherein the determined monochromatic wavefield is computed using at least one Green's function.

22. The method of claim 15 further comprising deriving Kirchhoff migration amplitude factors from the computed monochromatic wavefield.

23. The method of claim 15 wherein the determined monochromatic wavefield further comprises computing a wavefield on a polyhedral surface.

24. The method of claim 15 wherein the determined monochromatic wavefield further comprises computing a wavefield on a polyhedral surface that is a icosahedron.

25. The method of claim 15 wherein determining the monochromatic wavefield further comprises computing a solution to at least one of: i) a one way elastic wave equation, ii) a two way elastic wave equation, iii) a one way acoustic wave equation and iv) a two way acoustic wave equation.

26. The method of claim 15 wherein determining the monochromatic wavefield further comprises solving for wave equation solutions that are at least one of: i) a finite difference method, ii) a finite element method, iii) an explicit method, iv) an implicit method and v) a Fourier transform method.

27. The method of claim 15 wherein determining the travel time of the seismic wave to the at least one CP further comprises at least one of: i) analyzing the local gradient of a travel time, ii) analyzing the local gradient of a wrapped phase, iii) determining a highest amplitude the at least one NCP, iv) determining the smallest unwrapped phase of the at least one NCP, v) fitting a plane wave to the at least one NCP, vi) fitting a weighted plane wave to the at least one NCP, and vii) computing a weighted Huygen's wavelet from the at least one NCP.

28. A method for determination of a travel time of a seismic wave from a surface location to at least one computation point (CP) within a plurality of subsurface location points comprising:

(a) defining a velocity model of a region including said plurality of subsurface location points;

(b) computing a wavefield for at least one selected frequency, using the velocity model, for the at least one CP;

(c) determining an unwrapped phase of the seismic wave at at least one neighboring computation point (NCP) proximate to the at least one CP in said plurality of location points; and (d) determining the travel time of the seismic wave to the at least one CP from said determined unwrapped phase and said computed wavefield for the at least one CP.

29. The method of claim 28 wherein said surface location is at least one of: i) a source location, and ii) a receiver location.

30. The method of claim 28 wherein computing the wavefield for the at least one CP further comprises determining a wavefield solution for at least one selected frequency to at least one of: i) a one way elastic wave equation, ii) a two way elastic wave equation, iii) a one way acoustic equation, and iv) a two way acoustic wave equation.

31. The method of claim 30 wherein computing the wavefield further comprises solving for wave equation solutions with at least one of: i) a finite element method, ii) a finite difference method, iii) an explicit method, and iv) an implicit method.

32. The method of claim 30 wherein computing the wavefield further comprises using at least one Green's function for the at least one selected frequency.

33. The method of claim 30 further comprising deriving Kirchhoff migration amplitude factors from the computed wavefield.

34. The method of claim 28 wherein the at least one CP comprises a plurality of CPs.

35. The method of claim 28 wherein the at least one NCP comprises a plurality of NCPs.

36. The method of claim 28 further comprising determining, from the at least one computed travel time, at least one of: i) a travel time map, and ii) a travel time table.

37. The method of claim 28 wherein the at least one NCP comprises a plurality of NCPs, the method further comprising determining the phase of the plurality of NCPs by forming a weighted sum of the phases of the plurality of NCPs.

38. The method of claim 28 wherein determining an unwrapped phase of the at least one CP comprises limiting the unwrapped phase of the at least one CP to be within $\pm\pi$ of the determined phase for the at least one NCP.

39. The method of claim 1 wherein determining the travel time further comprises computing the wavefield for at least one selected frequency on a polyhedral surface.

40. The method of claim 1 wherein determining the travel time further comprises computing the wavefield for at least one selected frequency on a polyhedral surface that is a icosahedron.

41. The method of claim 15 wherein determining the travel time of the seismic wave to the at least one CP further comprises at least one of: i) analyzing the local gradient of a travel time, ii) analyzing the local gradient of a wrapped phase, iii) determining a highest amplitude the at least one NCP, iv) determining the smallest unwrapped phase of the at least one NCP, v) fitting a plane wave to the at least one NCP, vi) fitting a weighted plane wave to the at least one NCP, and vii) computing a weighted Huygen's wavelet from the at least one NCP.

* * * * *